Oct. 9, 1934.   J. SORENSON   1,976,045
OCCLUSAL INSTRUMENT
Filed May 28, 1932
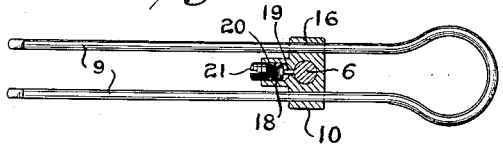
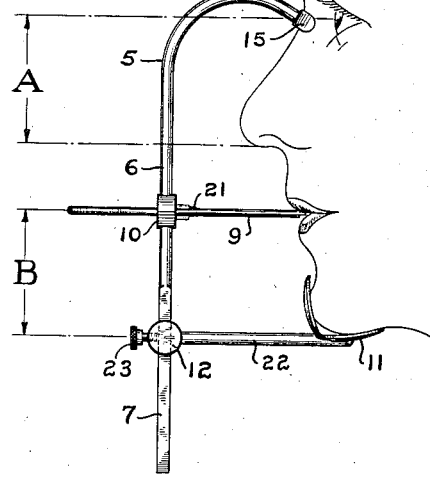
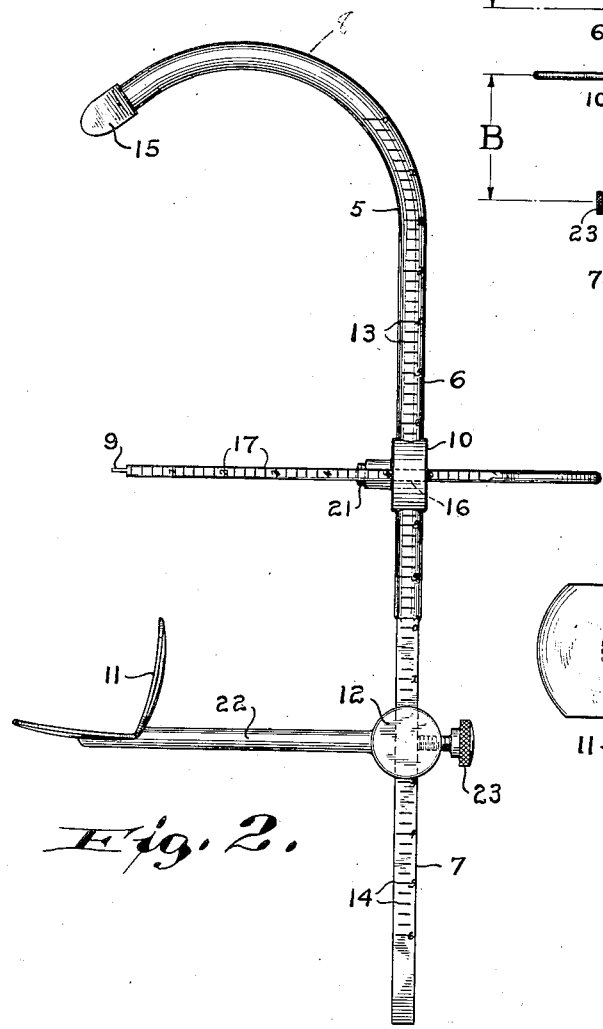
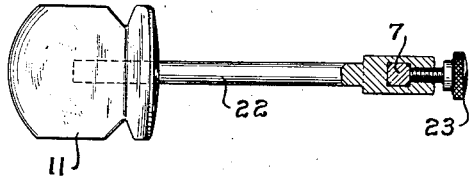
INVENTOR.
J. Sorenson
BY Morsell & Morsell
ATTORNEYS.

Patented Oct. 9, 1934

1,976,045

UNITED STATES PATENT OFFICE 1,976,045

OCCLUSAL INSTRUMENT

James Sorenson, Fond du Lac, Wis.

Application May 28, 1932, Serial No. 614,121

2 Claims. (Cl. 33—174)

The present invention relates in general to improvements in the art of prosthodontia, and relates more specifically to improved apparatus for obtaining occlusal measurements and for maintaining or restoring natural facial conditions and expressions with artificial dentures.

Generally defined, an object of the invention is to provide an improved occlusal instrument intended for use by dentists in maintaining or restoring natural facial conditions with the aid of scientifically constructed artificial dentures, and more especially to provide simple and highly efficient apparatus for permitting dentists to obtain accurate and complete occlusal measurements.

Although the dental profession has recently recognized the extreme value of obtaining and the necessity of utilizing accurate profile measurements and recordings, preferably made while the natural teeth are still in place, in order to maintain or restore natural facial conditions, no great practical application has thus far been made of this scientific principle. The numerous difficulties encountered in attempting to secure accurate measurements and records of this kind with the prior methods and apparatus, and the excessive time and study required to subsequently utilize the obtained data for any advantageous purposes whatever, have caused most dentists to abandon the idea and have left only a relatively few of the more persistent endeavoring to follow this scientific art of expression restoration.

Long and intensive study of the average human face has revealed the existence of a fixed law, that with the head erect, the vertical distance from the pupil of the eye to the naso spinale, is equal to the vertical distance from the center of the lip line to the bottom of the mandible. The prior instruments for obtaining measurements and recordings of facial profiles have been ineffective and impractical, first, because they did not involve any fixed law such as the foregoing, and, secondly, because they did not provide for a definitely positioned point on the average face with respect to which the measurements were made, in their operation and use. This would naturally cause the data obtained with these prior devices, to be extremely uncertain and difficult to apply in the subsequent production of artificial dentures, and hence gave little practical utility thereto.

It is a more specific object of the present invention to provide improved instrumentalities for securing accurate data whereby natural facial expressions may be retained or restored with artificial dentures.

Another specific object of the invention is to provide improved means for obtaining either the original or improved facial conditions with artificial dentures, regardless of whether or not the natural teeth are in place at the time when measurements for the dentures are recorded.

A further specific object of the invention is to provide a device for utilizing the above recited law to either reproduce natural facial expressions or to produce corrective facial conditions, with minimum effort on the part of the prosthodontist.

Still another specific object of the invention is to provide a simple and effective mechanism for securing measurements and records for use in constructing artificial dentures, by utilizing the pupil of the patient's eye as a fixed point of calculation for all measurements.

Another specific object of the invention is to provide a simple and readily manipulable instrument for securing accurate measurements from the faces of patients, preparatory to the construction of artificial dentures.

A further specific object of the invention is to provide a new and useful facial measurement indicator, which may be manufactured and sold at moderate cost, and which can be utilized to quickly and accurately indicate the desired readings.

Still another specific object of the invention is to provide a measuring device adapted to coact with the bridge of the nose, and calibrated to secure readings based upon the location of the pupil of the eye, for use in manufacturing artificial perfect dentures.

Another specific object of the invention is to provide a dental indicating implement which can be quickly applied without inconvenience to the patient, to secure accurate measurements adapted to readily permit reproduction of natural facial conditions, with artificial dentures.

These and other objects and advantages will be apparent from the following detailed description.

A clear conception of the construction and mode of operating an instrument adapted for efficient determination of the aforesaid data, may be had by referring to the drawing accompanying and forming a part of this specification in which like reference characters designate the same or similar parts in the several views:

Fig. 1 is a general side view illustrating the mode of applying the improved measurement indicator to the face of a patient;

Fig. 2 is an enlarged side elevation of the improved measuring instrument, showing the graduations thereon;

Fig. 3 is a similarly enlarged horizontal section through the instrument, taken at the pointer; and Fig. 4 is a likewise enlarged horizontal section through the instrument, taken at the mandible or chin seat.

Referring specifically to Figs. 2, 3 and 4, the improved instrument comprises in general a main frame or rod 5 having straight alined medial and lower portions 6, 7 respectively, and a curved upper portion 8; a U-shaped pointer 9 horizontally slidably mounted in a block 10 which is vertically slidable along and rotatable about the straight medial portions 6 of the rod 5; and a mandible or chin seat 11 carried by a lower block 12 which is vertically slidable along but fixed against rotation relative to the lower portion 7 of the rod 5.

The main frame or rod 5 may be formed of metal stock suitably plated and polished, and the medial and upper portions 6, 8 of this frame may be of circular cross-section, while the lower portion 7 is square or rectangular in cross-section. The medial circular rod portion 6 is calibrated or provided with designated graduations 13 starting with zero graduation disposed in horizontal alinement with the pupil of the eye of a patient when the instrument is applied as shown in Fig. 1, but the upper of these graduations 13 while shown in the drawing, may be omitted from commercial devices as they cannot be utilized for the taking of actual readings since they are beyond the range of movement of the block 10. The lower square rod portion 7 is also calibrated with graduations 14 starting with zero near the junction of the portions 6, 7, and the graduations 13, 14 preferably follow the metric scale. The upper curved rod portion 8 is tangent at one end to the medial portion 6, and carries a bridge piece 15 at its opposite end adapted to engage or coact with the bridge of the nose of the patient in the manner illustrated in Fig. 1.

As shown in Fig. 3, the U-shaped pointer 9 is slidable in transverse parallel openings 16 which penetrate the supporting block 10, and as indicated in Fig. 2, one leg of the pointer 9 is also calibrated with graduations 17 starting at zero located at the marking or indicating end of the pointer. The opposite end of the pointer 9 is provided with a grip portion formed integral with the legs, the entire pointer being formed of spring metal and the legs being normally biased away from each other so that when they are disposed within the block openings 16, the pointer will be frictionally retained in any position of adjustment relative to the block 10. The pointer supporting block 10 which is slidable along the medial rod portion 6 has a recess 18 therein between the openings 16, and a plunger 19 located within the recess 18 coacts with one end of a coil spring 20 the opposite end of which engages a screw plug 21 carried by the block 10. The tension of the spring 20 may be varied by adjusting the plug 21, and the point of the plunger 19 directly frictionally engages the rod portion 6 to retain the block 10 in any desired position of adjustment.

As shown in Fig. 4, the mandible or chin seat 11 is formed of sheet metal and is rigidly attached to one end of a bar 22 the opposite end of which is likewise secured to the carrier block 12. The block 12 is provided with a square hole and snugly engages the square lower rod portion 7. A set screw 23 coacting with a threaded hole in the block 12, is adapted to coact directly with the rod portion 7 to lock the chin seat 11 in any desired position of adjustment relative to the main frame rod 5. The chin seat 11 as well as all other parts of the instrument, are preferably plated and polished to present a neat and highly finished appearance.

In preparing to make use of the improved instrument, the set screw 23 should be released to permit free vertical sliding of the block 12, and the pointer 9 should be slid back so as to leave the space between the bridge piece 15 and the chin seat 11 free from obstruction. The device may then be applied to the face of a patient by setting the bridge piece 15 into the deepest depression on the bridge of the nose so that upward shifting of the instrument is positively prevented or arrested by the frontal bone of the skull, and by bringing the seat 11 into engagement with the bottom of the mandible and subsequently tightening the set screw 23 to lock the block 12 in place. The point of the pointer 9 may then be swung freely in either direction, moved horizontally, and brought to any elevation in order to secure accurate readings which may be recorded upon a properly prepared index card.

The readings designated A and B on Fig. 1, are relatively important and should always be taken in order to determine the vertical distance between the lower limit of the reading A to the upper limit of the reading B. As previously indicated, it has been found that in the average face and in well balanced faces, the readings A and B are substantially equal, so that if the reading A is secured, the reading B obviously can be calculated with absolute certainty. Since all readings or measurements are determined with reference to the center of the pupil of the eye, they must necessarily be accurate, and the recordings may be utilized to construct artificial dentures which will positively maintain and restore natural facial conditions. If the upper natural teeth are not in place when the improved implement is used, the readings A and B may still be obtained by direct use of the device, but if all of the natural teeth are missing, the reading A may be positively obtained and the reading B may be calculated.

The various measurements obtained with the improved gage mechanism, may be readily secured and reproduced with the aid of the pointer 9 which may be slid horizontally, rotated in a horizontal plane, or raised and lowered at the will of the operator. The several readings may be made adjacent to the blocks 10, 12, and by recording these readings on an index card, the instrument need not be retained in any definite condition of setting, in order to make accurate reproductions.

These readings besides including A and B shown on the drawing, should also include the location of the incisal edge, the fullness of the lips, the distance between the adjacent limits of A and B; the height of the teeth still in place, the horizontal distances from the frame 5 to various portions of the face and teeth, and any other recordings which will facilitate reproduction of natural facial conditions and expressions. By securing horizontal measurements from the frame 5 or from a median line dropped from the bridge piece 15 to the seat 11, to the front of the natural teeth, to the front of the lips, and to the tip of the nose, the reproduction of natural facial conditions is greatly facilitated. The measurement to the tip of the nose enables the user of the instrument to absolutely determine the correct bite when constructing the artificial denture, since this measurement will vary upon any slight mis-alinement of the upper and lower teeth. By virtue of the fact that the bridge piece 15 and the chin seat 11 are curved and co-act with substantially vertically alined arcuate portions of the face, the improved instrument may be freely swung to various angular positions about the nose and chin as pivots and relative to the central vertical plane of the face without danger of displacing the device vertically. This feature permits the taking of measurements throughout a considerable range both vertically and horizontally, and thus further facilitates the construction of the artificial dentures.

All measurements may obviously be secured quickly, accurately and without excessive annoyance to the patient, and the reproductions thereof may likewise be accurately and quickly produced by virtue of the facts that a fixed law has been followed and a definite starting point has been utilized in obtaining the facial recordings. The artificial dentures finally constructed from measurements thus obtained must be scientifically correct and will reproduce natural facial conditions and may even be utilized to produce corrective facial expressions. It must be apparent from the foregoing description, that the invention provides a faultless and simple apparatus for effectively reproducing desired facial conditions with artificial dentures, extensive commercial practice of the invention having fully verified the various assertions made herein.

It should be understood that it is not desired to limit the present invention to the exact details of construction of the apparatus herein described and illustrated, for various modifications within the scope of the claims may occur to persons skilled in the art.

It is claimed and desired to secure by Letters Patent:

1. A dental measuring instrument comprising, a frame consisting of a single upright calibrated rod having a laterally projecting upper arm, a bridge piece secured to the free end of said arm and curved to fit downwardly into the bridge of the nose so as to permit free pivoting of the frame about the center of curvature of the bridge piece, a mandible seat adjustable along the calibrated frame rod and having a curved seating portion fixedly disposed in vertical alinement with said bridge piece so as to cooperate with the latter to provide for said free pivoting of the frame, and a calibrated indicating pointer adjustable along the frame rod between said mandible seat and said frame arm, said pointer being both slidable transversely of said frame rod and rotatable about the axis thereof.

2. A dental measuring instrument comprising, a frame consisting of a single upright calibrated rod having a laterally projecting upper arm, a bridge piece secured to the free end of said arm and curved to fit downwardly into the bridge of the nose so as to permit free pivoting of the frame about the center of curvature of the bridge piece, a mandible seat adjustable along the calibrated frame rod and having a curved seating portion fixedly disposed in vertical alinement with said bridge piece so as to cooperate with the latter to provide for said free pivoting of the frame, and a calibrated indicating pointer adjustable along the frame rod between said mandible seat and said frame arm, said pointer being of bifurcated construction with arms disposed on opposite sides of said frame rod so as to provide spaced contact points which are both movable transversely of said rod and revolvable about the axis thereof.

JAMES SORENSON.